United States Patent [19]

Auerbach et al.

[11] 3,877,019

[45] Apr. 8, 1975

[54] PHOTOMEASURING DEVICE FOR COMPUTER STORAGE OF PHOTOGRAPHIC AND OTHER MATERIALS

[75] Inventors: Sidney Auerbach, White Bear Lake, Minn.; Alfred Lovitz, Jr., Huntington, W. Va.

[73] Assignee: Object Recognition Systems, Inc., New York, N.Y.

[22] Filed: May 24, 1971

[21] Appl. No.: 135,217

Related U.S. Application Data

[63] Continuation of Ser. No. 14,801, March 2, 1970, abandoned, which is a continuation of Ser. No. 509,745, Nov. 26, 1965, abandoned.

[52] U.S. Cl. ...................... 340/347 AD; 250/219 D
[51] Int. Cl. .......................................... H03k 13/02
[58] Field of Search ........... 356/203, 205, 202, 158, 356/160, 199, 166; 178/6.8; 250/219; 340/347 AD, 347 DD, 146.3

[56] References Cited

UNITED STATES PATENTS

| | | | |
|---|---|---|---|
| 2,912,497 | 11/1959 | Parrott | 178/7.6 |
| 2,994,863 | 8/1961 | Trapnell, Jr. | 340/347 |
| 3,305,834 | 2/1967 | Cooper et al. | 340/146.3 |

FOREIGN PATENTS OR APPLICATIONS

| | | | |
|---|---|---|---|
| 539,740 | 9/1941 | United Kingdom | 178/7.6 |

*Primary Examiner*—Joseph F. Ruggiero
*Attorney, Agent, or Firm*—Reisman & Kirsch

[57] ABSTRACT

A light image of an object to be recognized is scanned in a series of narrow elongated laterally displaced parallel areas. Photoelectric means responds successively to the overall light from successive areas and produces corresponding signals. These signals are converted to corresponding digital values. The resultant digital representation of the object may be compared by a computer with digital representations of other objects obtained in the same manner to determine whether they are like or unlike.

6 Claims, 2 Drawing Figures

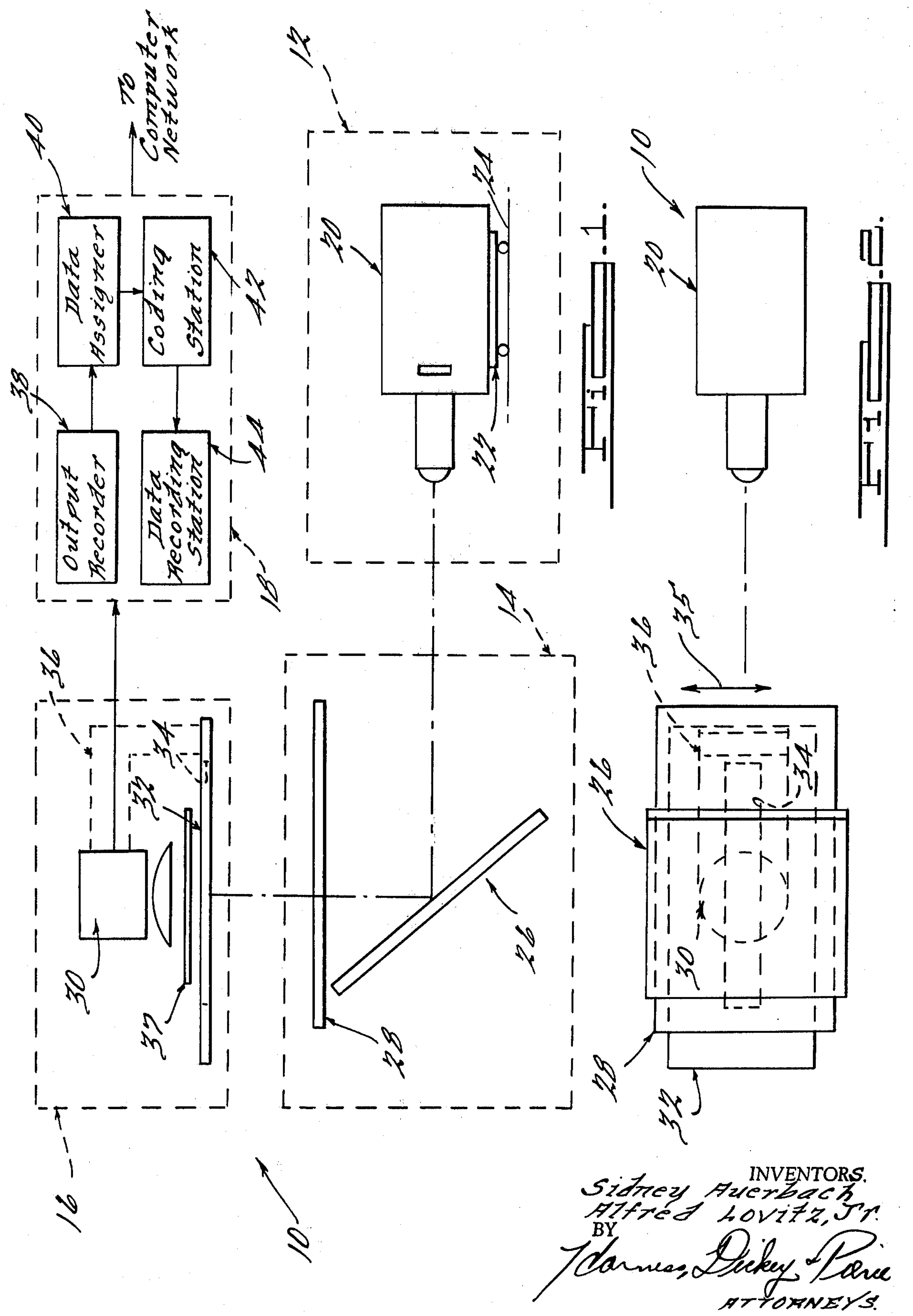
INVENTORS.
Sidney Auerbach
Alfred Lovitz, Jr.
BY
Harness, Dickey & Pierce
ATTORNEYS.

PHOTOMEASURING DEVICE FOR COMPUTER STORAGE OF PHOTOGRAPHIC AND OTHER MATERIALS

This application is a continuation of application Ser. No. 14,801 filed on Mar. 2, 1970, now abandoned, which in turn was a continuation of application Ser. No. 509.745, filed on Nov. 26, 1965, now abandoned.

This invention relates generally to photomeasuring devices and, more particularly, to a new and improved photomeasuring apparatus for producing digital representations of objects for use in conjunction with computer storage systems and the like for object recognition.

Generally speaking, the present invention is directed toward a method and apparatus for assigning a coded set of values to an object being studied, which code may be transferred to a computer storage system for future reference and comparison with coded values of similar objects. More particularly, the present invention is directed toward a new and improved method and apparatus for analyzing an object by dividing a projected image of the object into a series of successively arranged narrow elongated areas, each of which is assigned a coded value proportional to the relative overall density thereof. This set of coded values is then transmitted to a suitable computer storage or memory system in a particular ordered form of serial density values. At such time as an unknown object is studied, the density values of the unknown object which is obtained in an identical manner is compared with the values of the known object, the particular computer being programmed for maximum or minimum leniency or deviation from the density values of the known object so that if the values of the unknown object falls within the limitations of the program, the computer would then "recognize" the unknown object for purposes of evaluation, storage or the like. The particular computer can be adjusted such that the deviation or leniency of the program may be varied considerably so that the density values of a multiplicity of unknown objects will fall within the general category or class of values of the known object.

It is a general object of the present invention to provide a method and apparatus of the above character wherein the serial density of values assigned to and representative of the density of a multiplicity of object elements remains completely linear.

It is another object of the present invention to provide a new and improved method and apparatus of the above character which is adapted to accurately analyze and code an object in a minimum period of time.

It is still another object of the present invention to provide a new and improved method and apparatus of the above character which comprises readily available components and is therefore economical to commercially manufacture.

It is still another object of the present invention to provide an apparatus of the above character which is extremely compact in size and is therefore easy to handle and transport.

It is yet a further object of the present invention to provide a method and apparatus of the above character which is adapted to analyze and code photographic transparencies which are either in color or in black and white.

It is yet another object of the present invention to provide a new and improved method and apparatus of the above character which will accommodate transparencies of various sizes.

It is still a further object of the present invention to provide a new and improved method and apparatus of the above character which will accommodate opaque media (photos, drawings, actual objects) and also projected images from microscopes, etc.

In accordance with the invention, a light image of an object to be recognized is scanned in a series of narrow elongated laterally displaced parallel areas. Photoelectric means responds to the overall light from successive narrow elongated areas and produces corresponding signals. These signals are converted to corresponding digital values. The resultant digital representation of the object may be compared by a computer with digital representations of other objects obtained in the same manner to determine whether they are like or unlike.

Inasmuch as only a moderate number of digits are required to represent the object, comparison is greatly facilitated and useful results obtained.

In the specific embodiment described hereinafter an image of the object is projected onto a display screen. A mask having a narrow elongated slit is positioned between the display screen and the photoelectric means. The mask and light image are relatively movable in a direction lateral to the length of the slit so that light passing through the slit to the photoelectric means corresponds successively to successive narrow elongated areas of the light image. The photoelectric means responds to the overall light passing through the slit in each position thereof, so that its output and the corresponding digital values represent variations in the overall light through the slit as it scans across the light image. The movement of the slit relative to the light image may be incremented in steps approximately equal to the width of the slit.

Other objects and advantages of the present invention will become apparent from the following detailed description taken in conjunction with the accompanying drawings, wherein:

FIG. 1 is a top elevational view of an exemplary embodiment of the apparatus of the present invention; and FIG. 2 is a side elevational view of the apparatus illustrated in FIG. 1.

Referring now to FIGS. 1 and 2 of the drawings, a photomeasuring device or apparatus 10, in accordance with an exemplary construction of the present invention, is shown as comprising four modes or sections, namely, an image or pattern producing mode 12, an image or pattern conveying mode 14, a photomeasuring mode 16 and a data recording mode 18. The mode or section 12 is adapted to produce a light image or pattern of the object being analyzed by the apparatus 10, which image or pattern is conveyed through the mode 14 to the photomeasuring mode 16. The projected pattern or image is then analyzed by a light sensitive mechanism which produces a series of electrical signals in accordance with the density pattern of the image. These signals are then converted into a form suitable to be stored in a computer memory system for future reference, as will hereinafter be described.

Referring now in detail to the image or pattern producing mode 12, there is provided an image producing mechanism 20 which may be in the form of a photographic slide projector, opaque projector or projection microscope, depending upon the particular type and size of the object being analyzed, i.e., an actual object, microfilm, photomicrograph, photographic slide, negative, positive or the like. The mechanism 20 is preferably mounted on suitable means in the form of a carriage 22 which is slidable on a support surface 24 to provide for longitudinal sliding movement of the mechanism 20 relative to the conveying mode 14 so that the size of the image or pattern produced by the mechanism 20 may be adjusted, as will later be described. The image produced by the mechanism 20 is adapted to be transmitted to the conveying mode 14 which, in the exemplary embodiment described herein, comprises a vertically extending first surface mirror 26 that is disposed at a 45 degree angle from the line of projection of the mechanism 20. The mode 14 also includes a vertically extending light image display screen 28 which is preferably constructed of a sheet of ground glass or the like and is disposed at a 45° angle from the mirror 26 and at a 90° angle from the line of projection of the mechanism 20. It may be noted that the mirror 26 is not necessary if the mechanism 20 is located directly in front of the screen 28, as will be apparent.

Located on the opposite side of the screen 28 from the mirror 26 is the photomeasuring mode 16 which includes a light sensitive mechanism 30 that is adapted to produce an electrical signal in accordance with the intensity of light transmitted through the screen 28 and hence in accordance with the degree of lightness or darkness of the image produced on the screen 28 by the mechanism 20. The signal thus produced by the light sensitive mechanism 30 is adapted to be transmitted to the data recording mode 18 which functions in a manner later to be described.

As best illustrated in FIG. 1, the photomeasuring mode 16 includes a masking shield member 32 which is spaced from and extends substantially parallel to the screen 28 interjacent the light sensitive mechanism 30 and the screen 28. The masking member 32 is formed with a narrow elongated horizontally extending slit or aperture 34 which is preferably as long as the width of the image produced on the screen 28 by the mechanism 20, the aperture 34 being formed in the member 32 at a position aligned with the light sensitive mechanism 30, as seen in FIG. 2. The width of slit 34 is greatly exaggered in FIG. 2, and is actually very small as indicated in the specific example given hereinafter. The member 32 and mechanism 30 are preferably in a unitized assembly and mounted for incremental indexed movement in a vertical direction parallel to the screen 28, as indicated by the arrow 35 in FIG. 2. Means in the form of an electrically or spring powered carriage assembly, representatively indicated in FIG. 2 by the numeral 36, is provided for such vertical indexed movement, the assembly 36 preferably being adjustably operable so that the rate of indexing and height of incremental movement of the mechanism 30, shield member 32, relative to the one side of the screen 28 may be adjusted.

It may be noted that in analyzing certain types of patterns or images produced on the screen 28 by the mechanism 20, a suitable light condensing apparatus may be interposed between the light sensitive mechanisms 30 and the aperture 34 of the masking member 32. Means providing for such condensing is representatively shown at 37 in FIG. 1.

Referring now to the data recording mode 18, the electrical signals produced by the light sensitive mechanism 30 are adapted to be transmitted to an output recording system 38 which may be in the form of a strip recorder or other suitable recording apparatus (not shown). The system 38 is connected with a coding or data assigning system 40 which functions to assign scalar, numerical or other values to the signals received by the system 38. Inasmuch as the signals from the photoelectric means 30 are in analog form, known types of analog-todigital converters may be used to produce digital values from the corresponding analog signals. The data thus produced by the system 40 is adapted to be transmitted to a coding station 42 that translates the data into a form suitable for computer storage and analysis. This data is then in turn transmitted to a data recording station 44 which places the data on punch cards, paper or magnetic tape, or any other suitable form to be processed in an associated computer network (not shown).

To facilitate correlating the various component members and operational modes of the above described photomeasuring device 10, a brief description of an exemplary operational cycle thereof will now be given.

Initially, the object to be analyzed is placed within the image producing mechanism 20, i.e., slide projector, projection microscope or the like. The mechanism 20 is then adjusted relative to the surface 24 until the size of the pattern produced thereby is as large as a reference area or format of a predetermined size on the screen 28. In particular, the mechanism 20 is adjusted so that one end of the pattern is aligned with one end of the format and the pattern is thereafter enlarged or expanded, as by moving the projector 20 along the surface 24, until another edge of the pattern is aligned with one other edge of the format.

After the above described image sizing and positioning procedure has been completed, the assembly comprising the masking member 32 and light sensitive mechanism 30 is positioned such that the aperture 34 of the member 32 is located at one end of the pattern being produced on the screen 28. The mechanism 30 is then energized whereby the density of that portion or element of the image with which the aperture 34 and mechanism 30 register is sensed by the mechanism 30, at which time the assembly 36 is indexed causing the member 32 to be moved incrementally in a vertical direction as seen in FIG. 2. The distance that the assembly 36 moves is approximately equal to the width of the aperture 34 which, for example, when the object is a 2¼ inch × 3¼ inch photo transparency, is approximately 1 mm. As soon as the assembly 36 has been indexed, the mechanism 30 will automatically sense the density of the next element, this procedure being repeated until the member 32 and mechanism 30 have traversed the entire height of the image on the screen 28.

As the mechanism 30 thus moves across the image, it will produce an electrical signal for each incremental position it is moved to, each of these signals corresponding in intensity and/or magnitude in direct proportion to the density value of the particular narrow elongated area of the image. This group of serial density signals is then transmitted to and recorded by the output recording system 38 and is assigned suitable numerical or similar values by the system 40. These values are thereafter transmitted to the coding station 42 and the coded values are sent to the recording station 44 to be recorded on suitable means for processing in the associated computer network, as above described.

It will be seen from the foregoing description that the photomeasuring device 10 of the present invention will readily lend itself to measuring and recording various characteristic density patterns of a multiplicity of different objects from books, pictures and the like, to animal tissues having various disease peculiarities, so that comparisons can be made between the density pattern of unknown objects and objects which are already stored in the memory system of the associated computer network, for example, between tissues having lesions of known pathogenicity and prognosis with other tissue of other unknown potential. More particularly, it is contemplated that the associated computer network will include storage and retrieval sections, the former of which will be adapted to store the data obtained from the objects being studied, which data will be characteristic of a particular known pattern, object, or known diseased or nondiseased tissue or similar specimen. The retrieval section will be adapted, upon appropriate actuation thereof, to retrieve a specific prerecorded range of data representative of a known object for the purpose of numerical or similar comparison with the data provided by the photomeasurement of a specimen of unknown prognosis. It is also contemplated that the associated computer network may be programmed for maximum or minimum leniency or deviation from data of known objects so that if the data of an unknown object falls within the limitations of the program, the computer will "recognize" the unknown object for the purposes of evaluation, storage or the like. A particular computer can be programmed such that the deviation or leniency is varied considerably so that the matrices of a multiplicity of unknown objects will fall within a general category or class.

It may be noted that for certain applications, the masking shield 32 and light sensitive mechanism 30 may be fixedly mounted, and the modes 12 and 14 may be movable relative to the member 32 in the manner such that the pattern produced on the screen 28 traverses across the aperture 34 on the screen 32, whereby the mechanism 30 will sense the density values of the patterns, as above described. This type of construction particularly lends itself to an arrangement where two or more light sensitive mechanisms 30 could be used in conjunction with one another, the separate mechanism 30 being read out on individual channels for achieving greater density resolution along the length of the aperture 34 as the pattern moves relative thereto.

A particular feature of the photomeasuring device 10 of the present invention resides in the fact that a given set of data representative of a particular object or pattern is substantially linear throughout the density ranges under which it operates and thereby lends itself to accurate interpretation and analysis. It may be noted that a single specific code or series of digits will be assigned to each particular object so that each set of digits can be statistically manipulated. Related systems heretofore known and used have utilized a matrix concept wherein plotted intersecting data distributions comprising thousands to millions of points define a particular object. Since each of these points can vary in any direction, a standard deviation of a particular object, for all practical purposes, is impossible to obtain. In the system of the present invention, the serial density values of the object are obtained along a single plane and are of low enough magnitude to permit convenient manipulation. Object representation can be grouped into "classes" and be compared with other objects or classes.

Another feature of the present invention will be seen from the fact that the photomeasuring process may be accomplished in a relatively short period of time to provide for rapid analysis, evaluation and pattern comparison. Still another feature of the present invention will be seen from the fact that objects or specimens of virtually any size and structure may be studied and evaluated, from single cellular structures to complete objects such as pictures, books and the like. Furthermore, the above described apparatus of the present invention, by virtue of being constructed of readily available components, it economical to commercially manufacture.

While it will be apparent that an exemplary embodiment herein illustrated is well calculated to fulfill the objects above stated, it will be appreciated that the present invention is susceptible to modification, variation and change without departing from the proper scope or fair meaning of the subjoined claims.

What is claimed is:

1. Apparatus for producing a digital representation of an object to be recognized by comparing its digital representation to a set of digital representations of known objects which comprises means for producing a two-dimensional light image of an object field, scanning means for scanning said two-dimensional light image in a series of narrow elongated laterally displaced side-by-side areas, the lengths of said elongated areas extending across one dimension of the scanned area of said light image and the laterally displaced elongated areas extending across the other dimension of said scanned area, photoelectric means responsive successively to the overall light from successive narrow elongated areas in said series for producing signals successively representing the successive values of said overall light, and means for producing a digital value corresponding to each produced signal such that all of the produced digital values together are a digital representation of the object to be recognized.

2. Apparatus according to claim 1 in which said scanning means scans said series of narrow elongated areas incrementally, and said photoelectric means produces signals corresponding to successive incremental areas.

3. Apparatus according to claim 1 in which said scanning means includes a mask having a narrow elongated slit therein, said mask and light image being relatively movable in a direction lateral to the length of said slit to supply light from successive narrow elongated areas of said light image to said photoelectric means.

4. Apparatus according to claim 3 including a display screen, said light image being produced on said display screen and said mask being positioned between the display screen and said photoelectric means.

5. Apparatus according to claim 4 including means for adjusting the size of said light image on said display screen, whereby the width of the object to be recognized may be adjusted to correspond to the length of said slit.

6. The method of producing a digital representation of an object to be recognized by comparing its digital representation to a set of digital representations of known objects which comprises producing a two-dimensional light image of said object, scanning said two-dimensional light image in a series of narrow elongated laterally displaced side-by-side areas, the lengths of said elongated areas extending across one dimension of the scanned area of said light image and the laterally displaced elongated areas extending across the other dimension of said scanned area, photoelectrically producing signals successively representing the successive values of the overall light from successive narrow elongated areas in said series, and producing a digital value corresponding to each produced signal such that all of the produced digital values together are a digital representation of the object to be recognized.

* * * * *